United States Patent [19]
Beshay

[11] Patent Number: 5,153,241
[45] Date of Patent: Oct. 6, 1992

[54] POLYMER COMPOSITES BASED CELLULOSE-VI

[76] Inventor: Alphons D. Beshay, 3595 de Courval, Trois-Rivieres, Quebec, Canada, G8Z 1S8

[21] Appl. No.: 229,844

[22] Filed: Aug. 8, 1988

Related U.S. Application Data

[63] Continuation-in-part of Ser. No. 95,119, Sep. 11, 1987, Pat. No. 4,820,749, which is a continuation-in-part of Ser. No. 739,469, May 29, 1985, Pat. No. 4,717,742.

[51] Int. Cl.$^5$ .......................... C08K 9/00; C08K 9/02; C08K 3/00; C08K 5/00
[52] U.S. Cl. ........................................ 524/8; 523/202; 523/204; 523/216; 523/217; 524/4; 524/5; 524/13; 524/35; 524/583; 524/585
[58] Field of Search ............... 523/200, 204, 202, 216, 523/217; 524/8, 13, 35, 583, 585, 4, 5

[56] References Cited

U.S. PATENT DOCUMENTS

| | | | |
|---|---|---|---|
| 4,525,494 | 6/1985 | Andy | 523/200 |
| 4,559,376 | 12/1985 | Kubat et al. | 524/13 |
| 4,600,789 | 7/1986 | Sugarman et al. | 523/200 |
| 4,663,369 | 5/1987 | Kawai et al. | 523/200 |
| 4,820,749 | 4/1989 | Beshay | 523/203 |

FOREIGN PATENT DOCUMENTS

| | | | |
|---|---|---|---|
| 0063452 | 6/1978 | Japan | 523/200 |
| 0023138 | 2/1980 | Japan | 523/200 |
| 6161445 | 12/1981 | Japan | 524/13 |
| 1000262 | 1/1986 | Japan | 524/13 |
| 3179944 | 7/1988 | Japan | 523/200 |
| 2057458 | 4/1981 | United Kingdom | 524/34 |

*Primary Examiner*—Herbert J. Lilling

[57] ABSTRACT

Composite materials based celluyloses grafted with titanium coupling agents reinforce polymeric resins, cement and gypsum. Processes for preparing said composites are disclosed.

11 Claims, No Drawings

POLYMER COMPOSITES BASED CELLULOSE-VI

BACKGROUND OF THE INVENTION

This invention is a continuation in part for Beshay's pending patent application Ser. No. 07/095,119, filed Sep. 11, 1987, now U.S. Pat. No. 4,820,749, and which is a continuation in part of Ser. No. 06/739,469 filed May 27, 1985, U.S. Pat. No. 4,717,742.

This invention relates to composites based on cellulosic materials. More specifically, this invention relates to composites resulting from the grafted and bonded cellulosic materials with titanium coupling agents.

It is conventional to treat the fillers' surfaces used in resin composites for the purpose of improving their compatability with resin, adhesion to resin, or dispersibility in resin, by processes as for such treatments. Those processes such as wax coating, surface polymerization of monomers, or coupling agent treatment are well known in the art.

As described in said Beshay's U.S. Patent and his continuation in part, the composites' based cellulosic materials grafted with silylating agents enhance their physiomechanical properties in comparison to those based on cellulosic materials impregnated or treated with same silylating agents.

The term grafting means a deposition technique, whereby the organic material(s) may bonded chemically to a wide variety of other materials.

The grafting occurs at specific catalyst sites on the "host" materials, which must have some capacity for ion exchange, methathesis, or complex formation.

The specific catalyst may be a chemical compound such as peroxides or the like, or a radiation source such as gamma radiation, ultraviolet radiation or the like.

A combined use of the filler grafted with titanium coupling agent of this invention with consideration of costs and properties.

Hitherto, we believe to be the first to prepare composites based on grafted cellulosic materials with titanium coupling agents, for which we pray that a Patent may be granted to us.

SUMMARY OF THE INVENTION

It has now been found that the grafted and bonded cellulosic materials with a conventional titanium coupling agent disperse in a resin, compatible with resin, or adhere to resin, to give composites having physiomechanical properties substantially improved, due to the formation of interfacial chemical bonding.

The resin material may be of thermoplastic, or theremosetting properties or rubber.

The given composites' materials characterize by injection, moulding and/or compression properties.

According to the present invention the composite are made of cellulosic fibers or starch to be grafted and bonded with titanium coupling agent by the effect of generating free radical source.

Said composites comprising from 1-99% cellulosic fibers or starch and 1-99% polymer resin based on total composite weight; from 0.001-10% titanium coupling agent, whether prehydrolysed or not and 0.01-10% initiating source, base don the filler's weight.

The composite of the present invention also comprising by its weight from 0 to 95% inorganic material, from 0 to 10% of anhydride and from 0 to 80% other additives such as elastomers, plasticizers, colorants, flame retardants and the like.

Both organic and inorganic materials added may be in the form of fibers, films, chips, powders, flakes, particles, granules or other shapes.

The coupling agent may be added as it is, prehydrolyzed or dissolved in a solvent or in a solution containing other dispersed compounds. It also may be added in a liquidous or in a vaporous state.

The inorganic material may be mixed with the cellulosic material before or after the grafting process, or may be bonded with the titanium coupling agent or not. It may also be added to the resin before or after the bonding with said grafted cellulosic materials. The preferred addition of the inorganic material is being premixed with the cellulosic material before the grafting process. Anyhow, such additions of such materials are not limited to a certain process.

DETAILED DESCRIPTION OF THE EMBODIMENTS

The present invention will be described hereinbelow in details regarding to the following materials producing composites.

The cellulosic materials used in the present invention are cellulosic fibers derived from chemical thermomechanical wood pulp of aspen, semichemical pulp of bagasse and sawdust of spruce.

The used inorganic materials are calcium carbonate, asbestos and clay.

The used titanium coupling agents are isopropyltriiso, stearoyl titanate and isopropyl, Tri (n-ethylaminoethylamino) titanate.

The initiating source is benzoyl peroxide.

The used polymeric resins are linear low density polyethylene and polypropylene and polystyrene.

The anhydride material is maleic anhydride.

However, this invention is neither limited to these materials, nor to their weight ratios. It shows advantages when used with any kind of cellulosic materials such as cellulosic fibers, for example, soft or hard wood, sawdust, wood particles, wood chips, wood pulps, bagasse, bagasse pulp, nut shells, corn cogs, rice hulls, vegetable fibers, bambo fibers, cotton fibers, rayon fibers, wood shavings, recycled or waste paper, cartons, or cloth and the like.

The inorganic materials may be the hydroxyl containing inorganic materials, clay, calcium carbonate, asbestos, sand, wollastonite, quartz, glass, mica, diatomaceous earth, silica talc, kalonite, hydrated or partially hydrated metal oxides, metal powders, metal compounds, carbon, graphite, or a naturally occuring material or not, or the like.

Also other organic materials such as lignin or lignin compounds may replace the cellulosic filler materials or the inorganic materials.

The titanium coupling agent having the general molecular formula:

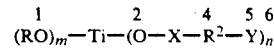

$$(RO)_m-\underset{}{Ti}-(O-X-R^2-Y)_n$$

where
 $m=1$, $n=3$—Monoalkoxy type
 $m=4$, $n=2$—Coordinate type
 $m=1$, $n=2$—Chelate type Function [(RO)$_m$] is the attachment of the hydrolyzable portion of the molecule to the surface of the filler, or proton bearing species, for example isopropyl, tri(dioctylpyrophosphate) titanate or the like.

Function 2 [Ti-(O)] provides transesterification to affect blocked acid catalysis, thixotropy, and increased foaming efficiency of z cyodicarbonamide.

Function 3 [-X-] affects performance as determined by the chemistry of alkylate, carboxyl, sulfonyl, phenolic, phosphate, pyrophosphate, and phosphite groups. Corrosion protection, acid resistance, and antioxidant effects ar possible.

Function 4 [-R$^2$-] provides van der Waals' entanglement via long carbon chains for thermoplastic impact improvement, internal lubricity for improved processing, a super plasticizing effect, and polymer compatibilization.

Function 5 [-Y] provides thermoset reactivity via functional groups such as methacrylates and amines.

Function 6 [)$_n$], two or three pendant organic groups allow functionality to be controlled from first to third degree.

The polymeric resin may be the resin having carbon to carbon linkages, or the resins mentioned as per Gaylord's U.S. Pat. No. 4,317,765 issued Mar. 2, 1982. Said resins may by a homopolymer, copolymer, resin blends, active modified resins, or the like having thermoplastic or thermoset properties or rubber.

Other additives may also be added such as elastomers, plasticizers, stabilizers, colorants, flame retardants or the like.

The generating radical source may be chemical compounds or radial sources. The chemical compounds may be peroxides such as t-butylperbenzoate, dicumyl peroxide, methylethylketone peroxide, benzoyl, peroxide, di-t-butyl peroxide, and 2,5-dimethyl-2,5-di(t-butyl peroxy) hexane. A more detailed compilation of free radical initiators which may by used is set forth at pages II-3, to II-51 of "Polymer Handbook", Interscience Publishers (1966). Also the grafting process may be carried out by the effect of gamma radiation, U.V. radiation or any other effective radiation source.

As a process for preparing composite materials based on cellulosic materials grafted and bonded with titanium coupling agents may be carried out as follows:

Wetting the cellulosic material with a titanium coupling agent. Subjecting said wetted cellulosic materials to an effective process to produce grafted and bonded cellulosic materials with titanium coupling agent such as by generating a radical source by the effect of benzoyl peroxide as a specific catalyst. Bonding said titanium grafted and bonded cellulosic materials with a polymeric resin of thermoplastics, thermosetting or rubber to give said composite materials. The cellulosic material is being premixed with inorganic materials before or after the wetting or the grafting and bonding steps.

It has also been found according to the present invention that the titanium grafted cellulosic materials, mixed or not with inorganic materials, reinforce cement and gypsum as explained by example No. 11.

This invention will now be furtherly described by nonlimiting examples.

EXAMPLE 1

10, 20, 30 and 40 parts of dried chemicalthermomechanical pulp derived from aspen of mesh size 60, are well mixed with 90, 80, 70 and 60 parts respectively of linear low density polyethylene, isotactic polypropylene and polystyrene. The filler is dispersed in the hot molten resin by using a compounding extruder, or the like, to give composites for molding or injecting for preparing specimens for testing the energy, stress and modulus. The testing results show very little improvement in comparison to their related virgin resins which reached 5% maximum.

EXAMPLE 2

In this example, the aspen pulp is treated or impregnated with a titanium coupling agent by wetting said pulp with a solution comprising 2% of isopropyltri(n-ethylaminoethylamino) titanate, and 50% acetone based on the pulp's weight wile stirring. The wetted pulp is then subjected to a warm air current till drying. The obtained titanium treated or impregnated pulp is then mixed with same resins and the specimens are also prepared and tested as per example 1. the testing results here show 20-40% improvement in comparison to their related virgin resins.

EXAMPLE 3

The composites here are prepared and evaluated as in example 2, but, in addition, 0.8% of benzoyl peroxide based on the pulp's weight is dissolved in the titanium-acetone solution before the wetting step. The testing results here show a considerable improvement which reach 50-120%.

EXAMPLE 4

Same experimentation as per example 3, but the acetone solution additionally contains 1% maleic anhydride. The results here show more improvement which reach 130% maximum.

EXAMPLE 5

The experimentation here is carried out as per example 3, but the chemicalthermomechanical aspen pulp is substituted by sawdust. The testing results show little lower than those of example 3.

EXAMPLE 6

The preparations and tests here are as per example 3, but the pulp is semichemicalpulp of bagasse. The testing results show no great difference as per example 3.

EXAMPLE 7

The experimentation here as per example 3, but the titanium coupling agent is isopropyl-triiso, stearoyl titanate. The results here are little higher than those of example 3.

EXAMPLE 8

Same experimentation as per example 3, but 10% of calcium carbonate based on the pulp's weight premixed with aspen pulp before the wetting step. In this example, the results show superior improvements given 80-190%.

EXAMPLE 9

As per example 7, but the Ca CO$_3$ is added after the drying step of the titanated pulp with the warm air current. The testing results give lower values than those realized in example 7.

EXAMPLE 10

The same preparations and testing as per example 3, but the wetting titanium solution is applied onto the resin granules instead onto the pulp. The preparation and testing of the specimens are followed as per example 1. The testing results indicate much lower values than those realized as per example 3.

EXAMPLE 11

The wetted aspen pulp prepared as per example 3, is kept in an oven at 80° C. for 2 hours, then mixed with Portland cement and water, percentages of which are 5/40/16 by weight respectively. The tested specimens are prepared according to ASTM standard No. C109 and C190 for tensile and compression tests respectively. The results are compared with those specimens prepared with the same weight percentages, but with untreated pulp. The improvements reached 400% for tensile tests and 280% for compression tests.

It will be understood that the above description of the present invention is susceptible to various modifications, changes and adaptations and the same are intended to be comprehended within the meaning and scope of equivalents of the appended claims.

I claim:

1. A composite material comprising a polymeric (or copolymeric) substance selected from thermoplastic material, and an organic material selected from the group consisting of cellulosic (material) fibers, wherein said cellulosic (material) fibers (is) are essentially grafted by a free radical generating process with a titanium coupling agent.

2. The composite material of claim 1, wherein the polymeric (or copolymeric) thermoplastic material is selected from the group consisting of polyethylene and polypropylene.

3. The cellulosic (material) fibers of claim 1, (is) are selected from the group consisting of wood fibers, wood pulp derived from aspen, birch and spruce.

4. The composite material of claim 1, is additionally comprising inorganic filler.

5. The composite material of claim 4, wherein the inorganic filler material is selected from the group consisting of calcium carbonate, glass, mica and asbestos.

6. The composite material of claim 1, wherein the cellulosic (material) fibers (is) are mixed with the inorganic filler material before or after the grafting process.

7. The composite material of claim 1, is characterized by injection molding.

8. The composite material of claim 1, is characterized by compression molding.

9. The grafted cellulosic (material) fibers of claim 1, wherein the titanium coupling agent is selected from the group consisting of isopropyltri(n-ethylaminoethylamino) titanate and isopropyltri-isostearoyl titanate.

10. Cement and mortar are reinforced with cellulosic fibers pregrafted by a free radical generating process with a titanium coupling agent.

11. Gypsum is reinforced with cellulosic fibers pregrafted by a free radical generating process with a titanium coupling agent.

* * * * *